United States Patent [19]

Gunn

[11] 3,930,729
[45] Jan. 6, 1976

[54] INTERFEROMETER APPARATUS INCORPORATING A SPHERICAL ELEMENT OF INDEX OF REFRACTION OF TWO

[75] Inventor: John Battiscombe Gunn, Mount Kisco, N.Y.

[73] Assignee: International Business Machines Corporation, Armonk, N.Y.

[22] Filed: June 29, 1973

[21] Appl. No.: 375,287

[52] U.S. Cl............ 356/106 R; 356/113; 308/DIG. 1
[51] Int. Cl.² ...................... G01B 9/02; F16C 7/04
[58] Field of Search ...... 356/106 R, 106 LR, 106 S, 356/107, 108, 109, 110, 111, 112, 113; 308/DIG. 1, 9

[56] References Cited
UNITED STATES PATENTS

| | | | |
|---|---|---|---|
| 3,148,456 | 9/1964 | Browning | 356/106 R |
| 3,158,674 | 11/1964 | Woodson | 356/106 |
| 3,398,287 | 8/1968 | Krogstad et al. | 356/106 R |
| 3,466,121 | 9/1969 | Turner | 356/106 R |
| R19,070 | 2/1934 | Chretian | 350/167 |

*Primary Examiner*—Alfred E. Smith
*Assistant Examiner*—Conrad J. Clark
*Attorney, Agent, or Firm*—Thomas J. Kilgannon, Jr.

[57] ABSTRACT

An interferometer arrangement of either the transmission or reflection type incorporating at least a pair of partially spherical or spherical elements having an index of refraction of approximately two is disclosed. In a preferred embodiment, the spherical or radiation directing elements are glass spheres having an index of refraction of approximately two at the wavelength of a light source being utilized. In a transmission type interferometer, both the spherical or radiation directing elements are utilized as beam splitters and collimators while, in the reflection type interferometer, one of these spheres is used as a beam splitter and collimator while the other is utilized as a retroreflector. The complete spherical symmetry of such radiation directing elements permits them to function with any orientation relative to the optical path between them.

Mechanisms in which desired motions are controlled with high precision by applying mechanical feedback to position a movable body relative to a fixed reference body, using the above described interferometer arrangement are also disclosed. The same mechanisms are capable of being controlled from a programmed computer causing the movable body to exhibit a desired motion using interference fringe detection schemes to both monitor and accurately position the movable body relative to a reference body.

Also disclosed is an actuator based on a hollow hydraulic cylinder having a given longitudinal axis which includes an interferometer arrangement incorporating at least a pair of spherical elements which have an optical axis substantially coincident with the longitudinal axis of the actuator. Also disclosed are transducer arrangements disposed in series with the actuator which are utilized to meet high frequency stability requirements.

39 Claims, 12 Drawing Figures

INTERFEROMETER APPARATUS INCORPORATING A SPHERICAL ELEMENT OF INDEX OF REFRACTION OF TWO

BACKGROUND OF THE INVENTION

1. Field of the Invention

This invention generally relates to interferometer arrangements and to mechanical systems which incorporate such interferometer arrangements for the precise measurement and positioning of related parts which have relative motion between such parts. More specifically it relates to an interferometer arrangement which utilizes a pair of spherical elements having an index of refraction substantially equal to two at a source wavelength as collimators and/or retroreflectors. In an arrangement shown, the centers of the spherical elements define known points on bodies which exhibit relative motion. Actuators which interconnect these points are mechanically positioned so that the centers of the spherical elements and the mechanical interconnection points are substantially coincident. Also, the actuators are arranged such that their longitudinal axes are substantially coincident with the optical axis of the interferometer arrangement. In this way, extremely accurate measurements are possible using known interferometer fringe detection circuits, the outputs of which may be utilized to energize the actuators so as to maintain the position of a movable body relative to a reference body or to cause the movable body to move in a desired way relative to the reference body. The arrangements shown have the advantage of permitting more complicated motion than rotation about an axis or rectilinear translation and of permitting the accuracy achievable by optical interferometry to be exploited to the utmost, without requiring any accurate mechanical guiding members such as ways or bearings. The arrangements shown also have the advantage of being able to provide absolute values of measurements rather than relative values of measurements.

2. Description of the Prior Art

Standard forms of interferometers measure the distance in optical wavelengths between two surfaces, the images of which can be superimposed by means of an optical system. For metrological purposes, however, the distance between two discrete points is often a more useful measurement. To do this with conventional interferometers requires that the two surfaces be accurately aligned and that the relationship of these surfaces to the points be determined. The necessity for alignment imposes undesirably stringent mechanical constraints if the measurement is to be made of the variable distance between two components of a mechanism. This difficulty has been overcome in the past by using retroreflectors. However, the types of retroreflectors which have been used can operate only with light incident from a limited range of directions and require the careful alignment of several optical surfaces within each retroreflector. The cube corner type, for example, requiring three reflecting planes to be set accurately perpendicularly, operates only to 30° off-axis; and suffers from second order errors of optical path lengths when constructed in the usual form of a trihedral prism. The cat's-eye form, consisting of concentric convex and concave spherical mirrors, can work up to 90° off-axis, but returns a hollow beam and requires accurate concentricity. In neither case is the center of reflection easy to locate accurately with respect to the structure, because of the lack of spherical symmetry.

To overcome these difficulties accurate spherical elements of optical material with a refractive index substantially equal to two at the wavelength of the light source are used as retroflectors. A spherical element with a refractive index of two has the property of bringing an incident parallel beam of light to a focus exactly on the rear surface of the sphere. The light which is internally reflected therein returns along the same path forming a collimated beam returning along the path of the incident beam. The useful return beam is not, of course, as large as the diameter of the sphere because of spherical aberrations, but these are negligible over an appreciable aperture.

Such a retroreflector consists of a single optical surface (a complete sphere) which is a particularly easy form to generate with accuracy. The center of reflection corresponds to the center of the sphere, and is thus easy to locate with precision. The complete spherical symmetry results in an ability to return light incident from any direction.

The apparatus summarized hereinabove provides an extremely accurate interferometer arrangement for measuring distances which can be combined with actuators to position a movable body relative to a reference body or to provide rather complicated motions to the movable body relative to the reference body. The arrangements shown use feedback to maintain the movable body in a desired position or utilize controlled actuation of a plurality of actuators to obtain a desired motion of the movable body relative to the reference body.

It is therefore an object of the present invention to provide a point-to-point interferometer which incorporates as retroreflectors accurate spheres of optical material with a refractive index of approximately 2.

Another object is to provide an interferometer arrangement which can be utilized either as a reflection or transmission type interferometer.

Another object is to provide an improved interferometer arrangement by eliminating the limited angular range of prior art retroreflectors.

Still another object is to provide mechanisms which incorporate such interferometers for controlling relative motion between portions of such mechanisms.

Another object is to provide an actuator in which the longitudinal axis of the actuator is coincident with the optical axis of an interferometer.

The foregoing and other objects and features of the present invention will be apparent from the following more particular description of a preferred embodiment of the present invention as illustrated in the accompanying drawings.

DESCRIPTION OF A PREFERRED EMBODIMENT

Figure 1:
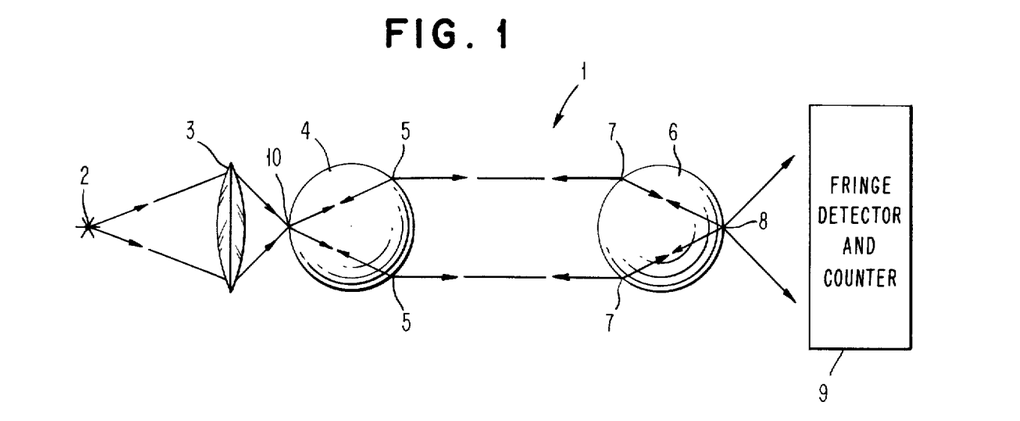
FIG. 1 is a schematic diagram of a transmission type interferometer which incorporates a pair of spherical or radiation directing elements having an index of refraction of two at the wavelength of an associated light source. A block entitled "Fringe Detector and Counter" is utilized to detect relative motion between the spherical elements.

Referring now to FIG. 1 there is shown therein a partial-schematic, partial-block diagram of a transmission type interferometer shown generally at 1. A source of electromagnetic energy shown at 2 is preferably a continuous wave laser which, for example, may have a wavelength of 6328A. This is the characteristic frequency of a helium-neon gas laser which is commercially available. Any laser or other source of electromagnetic wave energy ccould be utilized, but the choice is a function of price, and, as will be seen hereinafter, a function of the availability of materials which give a desired index of refraction at the wavelength of light source 2. In FIG. 1, lens 3 is a condenser lens which focuses a beam from light source 2 onto a spherical radiation directing element 4 which partially reflects and partially transmits the incident light from collimating surfaces 5 to another spherical radiation directing element 6 where the transmitted beam is bent at collimating surfaces 7 to focus at a point on a partially reflecting surface 8. The reflected portion of the beam incident on surface 8 is recollimated by refracting surfaces 7 and sent back along the same path, so that sphere 6 acts as a retroreflector. The returned beam is again focused by refracting surfaces 5 of sphere 4 upon the partially reflecting surface 10. The reflected portion is once more collimated, interfering with the original beam. In this manner, interference fringes which result from the cancellation and augmentation of the twice-reflected and unreflected portions of the incident light beam are obtained. The interference fringes are detected and counted by fringe detecting and bidirectional counter means which are well known to those skilled in the interferometry art. A fringe detector and counter of commercially available type is represented in FIG. 1 by block 9 and is otherwise indicated therein as fringe detector and counter. In FIG. 1, spherical radiation directing elements 4, 6 are designed to have a refractive index of approximately two at the wavelength of source 2. Spherical radiation directing elements 4, 6 may be fabricated from commercially available glasses such as Hoya Ta FD16 available from Hoya Glass Works Ltd., Tokyo, Japan, which have approximately an index of refraction of two at the wavelength of 6328A. An important feature of the arrangement of FIG. 1 is that the components at each end of interferometer 1 have complete spherical symmetry, so that they can accommodate angular variations while being rigidly attached to bodies, the distance between which one wishes to determine. Also, spherical radiation directing elements 4, 6 define easily located points (the centers of the spheres) through which the interferometer path always passes and whose separation is equal to the interferometer path, minus the optical radii of the spheres. Since the radii of spherical radiation directing elements 4, 6 are known, the arrangement of FIG. 1 may be utilized for absolute measurement of distance since the fringe count can be reset when spherical elements 4, 6 of known radii are in contact.

When spherical radiation directing elements 4, 6 have a refractive index of two, they have the property of bringing light from infinity of a focus exactly on the rear surface of the spherical elements. Also, light which is internally reflected from the rear surface of the spherical element returns along the same path forming a collimated beam returning to the point of origin at infinity. Thus the spherical elements act as retroreflectors. Of course, the useful return beam is not as large as the diameter of the spherical element, because of spherical abberations, but these are negligible over an appreciable aperture. Such a retroreflector consists of a single optical surface (a complete sphere) which is of a particularly easy form to fabricate with accuracy. The center of reflection corresponds to the center of the sphere, and is thus easy to locate with precision. The complete spherical symmetry results in an ability to return light incident from any direction.

In FIG. 1, radiation directing spherical element 4 may be replaced by conventional interferometer elements such as a half-silvered mirror. The latter permits the transmission and reflection of light from source 2 in a manner similar to that described in connection with spherical element 4. While an interferometer arrangement incorporating a half-silvered mirror does not possess complete spherical symmetry, the presence of one spherical radiation directing element is sufficient to provide an advantage over known prior art arrangements especially in terms of accuracy and ease of fabrication.

Figure 2:
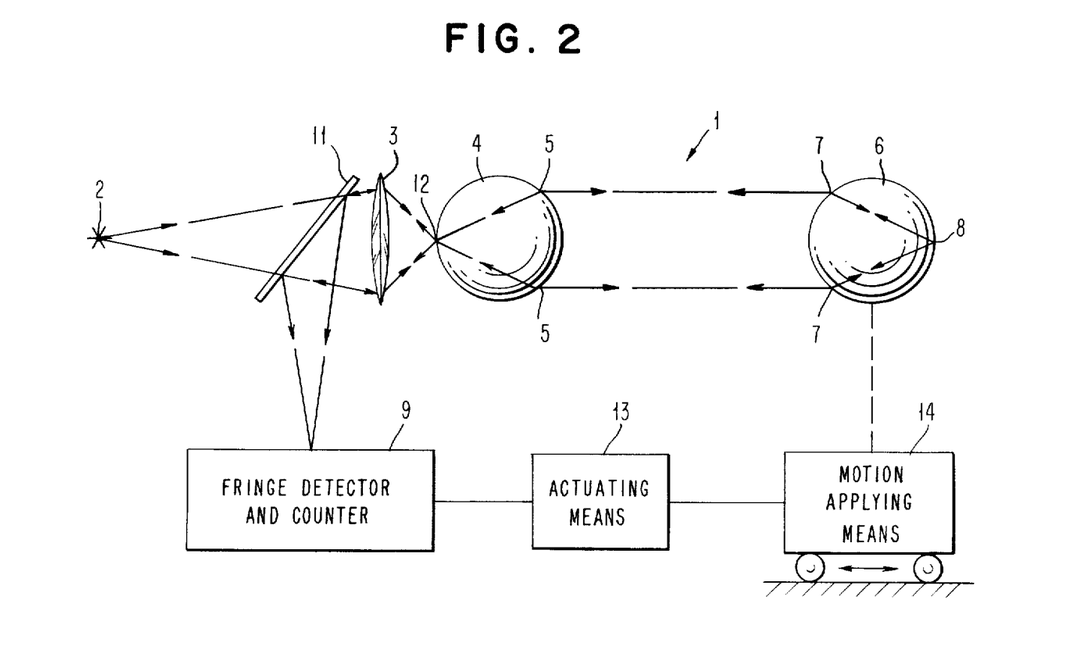
FIG. 2 is a schematic diagram of a reflection type interferometer in which one spherical or radiation directing element is utilized as a collimator and the other is utilized as a retroreflector. A beam splitter for viewing is also shown. A block entitled "Fringe Detector and Counter" represents a means for detecting and measuring relative motion between the spherical elements.

FIG. 2 shows an arrangement in which one spherical element is utilized as a retroreflector and another is used as a beam splitter and as a collimator.

Referring now to FIG. 2, an interferometer arrangement shown generally at 1 of the reflection type is shown. Electromagnetic energy from a source 2, preferably a laser, is projected at a beam splitter 11 from which the incident energy is partially reflected and partially transmitted. The partially transmitted component is focused by a condenser lens 3 onto a partially reflecting surface 12 of spherical radiation directing element 4. The transmitted energy is incident upon collimating surfaces 5 and is transmitted to the surface of a spherical radiation directing element 6 where, at collimating surface 7, the incident beam is focused on the rear surface 8 of sphere 6 from whence it is partially reflected via collimating surfaces 7 and 5 back to partially reflecting surface 12 where it interferes with the component of the beam from lens 3 which was originally partially reflected from surface 11, producing interference fringes. The resulting interference fringe patterns are transmitted via lens 3 and beam splitting mirror 11 to block 9 which represents well known fringe detector and counting circuits.

In FIG. 2, block 13 represents an actuating means which, in response to an output from fringe detector and counter 9, generates a signal which causes a motion or force applying means, represented by block 14, to directly move radiation directing element 6 or to indirectly move it by applying forces to movable elements to which element 6 is connected. Thus, in one mode, fringe detector and counter 9 may perform a purely monitoring function and count fringes which are ultimately converted to distance. In another mode, where a desired distance is required, a desired count may be introduced into a register associated with counter 9 and an output provided to actuating means 13 until a comparator (not shown) indicates zero difference between the desired and actual counts.

It should be noted in connection with FIGS. 1 and 2 that the functions of collimation and partial reflection are each performed by a spherical radiation directing element 4 or 6. In FIG. 2, it is the same spherical element 4 which does both, leaving spherical element 6 to act only as a retroreflector. Spherical element 6 is thus free of optical encumbrances, and is hence particularly convenient for use as a freely movable target. In this connection, it should be appreciated that spherical radiation directing element 6 can be substituted for by a prior art cube corner reflector. While this subjects the arrangement of FIG. 2 to limitations which are inherent with the use of cube corner reflectors, such as arrangement is still superior in terms of accuracy and ease of fabrication to prior art systems. Like the arrangement of FIG. 1, interferometer 1 of FIG. 2 is particularly adaptable to the absolute measurement of distance, since the fringe count can be reset when spherical elements 4, 6 (of known radii) are in contact.

In connection with FIGS. 1 and 2, it should be appreciated that spherical radiation directing elements 4, 6 can be simply mounted relative to light source 2 such that the optical axis of the arrangement passes through the center of spherical elements 4, 6. However, because of the complete spherical symmetry of the arrangements of FIGS. 1 and 2, spherical element 6 may be moved up or down from its position in FIG. 2, for example, without limiting the distance measuring ability or the accuracy of the arrangement. In actual practice, however, both spherical radiation directing elements 4, 6 are arranged such that the optical axis of the system can be drawn through the centers of spherical elements 4, 6, lens 3 and source 2. As has been indicated hereinabove, absolute measurements of distances can be made by resetting fringe detector and counter when spherical elements 4, 6 are placed in contact. Then, if spherical element 6 is moved, and the interference fringes counted in a bidirectional counter, for example, the range of spherical element 6 is known at all times to within one-half wavelength or less if a counter is used which records fractional fringe displacements.

Until this point, spherical radiation directing elements 4, 6 have been characterized as spheres having an index of refraction of two at the wavelength of the source being used. It should be appreciated that elements 4, 6 need not be spheres but may take the form of a truncated sphere. All that is required is that the incident radiation or light encounter reflecting and refracting surfaces which are normally encountered in elements having spherical geometry. Thus, a radiation directing element in FIG. 1, 2 may have flattened surfaces, for example, as long as reflecting and refracting surfaces 5, 7, 8, 10, and 12 preserve their sphericity and appear as concentric spherical surfaces to indicent light.

Because the arrangements of FIGS. 1 and 2 have the ability to accept large angular misalignments both between their retroreflectors and between each retroreflector and the optical path, certain mechanisms which were previously not available become attainable when the transmission interferometer arrangement of FIG. 2 is combined with linear actuators as will be seen hereinafter in connection with the discussion of FIGS. 3A, 3B. Before addressing the interferometer-actuator arrangements, the following background discussion should indicate some of the problems which the mechanisms disclosed overcome and some of the applications to which said mechanisms may be put.

There is a large class of mechanisms in which the object of the device is to constrain accurately the motion of a rigid body. This motion may be rotation about an axis, rectilinear translation or more complicated, and it may take place as a step-wise adjustment, motion in response to an external force in response to a control signal, or in response to the motion of another body. Such mechanisms commonly embody links, hinges, slideways, bearings, gears, cams and other mechanical elements. They are always of limited accuracy due to errors of part geometry, elastic deflection and unwanted but necessary clearances. The more accurate mechanisms are very expensive due to the amount of skilled handwork required in their fabrication.

In the past, attempts have been made to overcome these difficulties with active structures in which the position of a movable component is compared, either with the surface of a load-bearing guide member (e.g., a slideway), or with a nonload-bearing reference (e.g., a straight-edge or light beam). An error signal is then derived and a force is applied to the body so as to reduce the error in accordance with the standard principles of negative feedback. An example of the first type of system is a hydrostatic slide-bearing, while the second does not yet seem to have come into use although working models have been made. A disadvantage of both types of mechanism is that the reference must have a geometrical form which reproduces the motion desired and must be capable of being fabricated with the accuracy required. This limits the motions available, in practice, to rotation about an axis and rectilinear translation and does not permit the accuracy achievable by optical interferometry to be exploited to the full.

All of these difficulties can, however, be overcome, and a number of other advantages obtained, by abandoning the concept of references having the same geometry as the path to be followed. All that is actually required is to define the position of a movable body relative to a fixed reference body, and this can be done by imposing any six geometrical constraints on their relationship. If interferometry is to be exploited, these constraints must be linear measurements. A convenient arrangement is to define three noncollinear reference points on a movable body and three on a reference body; the six contraints are then any six distances between points on the two bodies. If the movable body is to follow a prescribed path, the six distances must vary in a complicated way which, in the past, would have ruled out such a mechanism. However, with the rapidly decreasing cost of digital computation, it is now possible to operate the system in the following way: Given the required position, the six required distances are calculated digitally and compared with the actual distances as obtained from the outputs of six optical interferometers and fringe counters. The six resulting error signals may each be applied to a linear actuator acting collinearly with the measured distance in such a way as to decrease the error. The movable body is thus brought into the required position.

The required position, generated as a set of numbers by a program in a computer, for example, may be varied with time in a number of different ways depending upon the application. The position can be changed on an external command to provide an adjustment or point-to-point control. The position can be incremented regularly, to move the body along a prescribed path of any shape at arbitrary velocities. If one or more actuators is omitted or disconnected while its associated interferometer is retained, the movable body acquires a corresponding number of degrees of freedom and, if the required position is then defined in the computer program as a locus, the movable body can be moved along this locus in response to external forces. More complicated schemes may be envisioned in which the body, although having one or more degrees of freedom for static displacement, still has forces exerted along all six axes when in motion. If these forces are made to depend on its velocity or acceleration, its motion can be made to simulate arbitrary viscous or inertial forces. Other bodies, linked to the same reference body by additional sets of interferometers and actuators, can have their positions defined as functions of the position of the first body and, thus complicated mechanisms can be built up. Such a structure might be described as a universal mechanism, for the same physical structure can be adapted to act in a great many different ways merely by a change in software in a computer.

Since the six linear measurements mentioned above must be made along directions variable with respect to the movable and reference bodies, a form of interferometer is required which can accept large angular misalignments both between its end mirrors and the optical path, and between the mirrors themselves. This problem can be overcome by the use of retroreflectors which return light exactly back along its direction of incidence. Such an arrangement is shown in FIG. 2. As indicated in connection with the discussion of FIG. 2, an important feature of the reflection type interferometer 1 is that the optical components at each end of the interferometer have complete spherical symmetry so that they can accommodate angular variations while rigidly attached to their respective bodies. The spherical elements define easily located points through which the interferometer path always passes and whose separation is equal to the interferometer path minus the optical radii of the spheres. Thus, using the interferometer arrangement of FIG. 2, six distances mentioned hereinabove can be established exactly without the intervention of any mechanical swivels which could lead to inaccuracy.

As indicated in connection with FIGS. 1 and 2, the six distances can be detected in the usual way by counting interference fringes with a bidirectional counter, for example. However, the absolute values of the distances, not just changes, enter into the calculation of the position of the body being moved. In this respect, spherical retroreflectors have another advantage in that a well defined reference point is established when the two spheres of an interferometer are in contact. As has been indicated previously, the separation of the reference points is then equal to the sum of the radii of the spheres, a quantity which is easily and accurately measured in other ways. Thus, if the fringe counter is simultaneously set to the equivalent of this distance, subsequent counts can be interpreted absolutely. Given a digital measure of each of the six distances (the contents of six fringe counters associated with six interferometer arrangements), comparison with the six correct values, and generation of digital, and then analog, error signals can be done straightforwardly. Feedback can be accomplished by applying the error signals to actuators, which then develop forces tending to reduce the errors. The simplest arrangement is to have the actuators collinear with the interferometer paths, applying forces through gimbals centered approximately on the spheres, but separately fixed to the bodies. Mechanical errors in the gimbals have no affect on the accuracy, and each actuator affects only the corresponding interferometer path (orthogonal feedback loops). However, if this is not convenient, the actuators can act along lines different from the interferometers, but there will then be interactions between the error signals. This complicates the problem of stability, but the feedback loops can be made orthogonal again, if necessary, by generating suitable composite error signals.

Figure 3A:
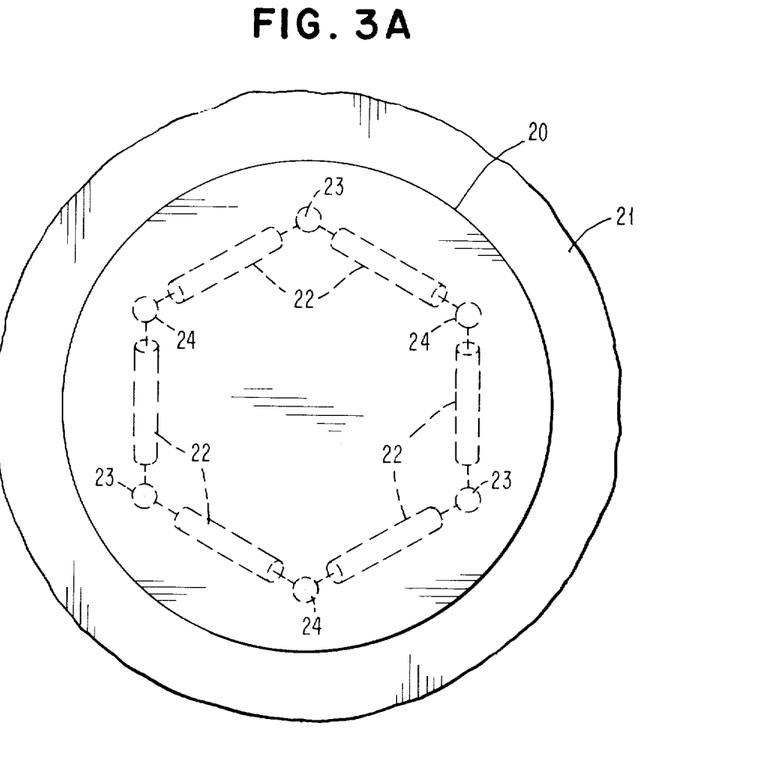
FIG. 3A is a top view of a mechanical arrangement in which a plurality of actuators interconnect three non-collinearly disposed points on a reference body and three on a movable body. Each linear actuator preferably incorporates an interferometer of the type shown in FIG. 2 in a form shown in FIG. 5.
Figure 3B:
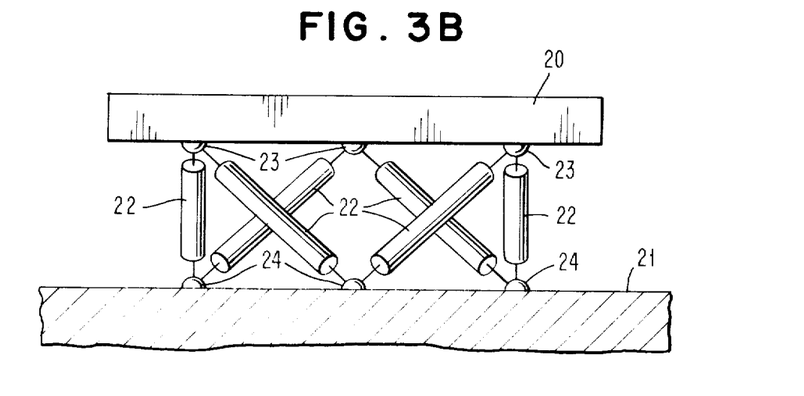
FIG. 3B is a side view of the mechanical arrangement of FIG. 3A.

A convenient geometry for achieving the results of the sort suggested in the above discussion is shown in FIGS. 3A and 3B. FIG. 3A is a top view of a mechanical arrangement in which a plurality of actuators interconnect three noncollinearly disposed points on a reference body and a movable body and, FIG. 3B is a side view of the arrangement of FIG. 3A. In FIG. 3A, a movable body 20 is connected to a reference body 21 by a plurality of combined actuators and interferometers 22 wherein the longitudinal axes and optical axes of the combined actuators and interferometers are coincident and has a geometry such that three reference points on each of the bodies 20, 21 are arranged in roughly equilateral triangles. Alternatively, actuators and interferometers 22 need not take the form where the optical axes and longitudinal axes are coincident but may also take the form wherein these axes are offset or displaced from each other. Thus, in the former instance, actuators 22 join each point 23 on movable body 20 with the two nearest points 24 on reference body 21. This can best be seen in FIG. 3B where center point 23 is joined by actuators 22 to the end points 24 on reference body 21. To obtain the best mechanical advantage, the two forces acting at any point should be approximately at right angles. In practice, points 23, 24 to which actuators 22 are connected can be spherical joints or gimballed bearings which permit forces from two actuators acting on a point to position reference body 20 in a desired manner. An arrangement wherein the longitudinal axes and optical axes are coincident will be shown and discussed hereinbelow in connection with FIG. 5.

Figure 4:
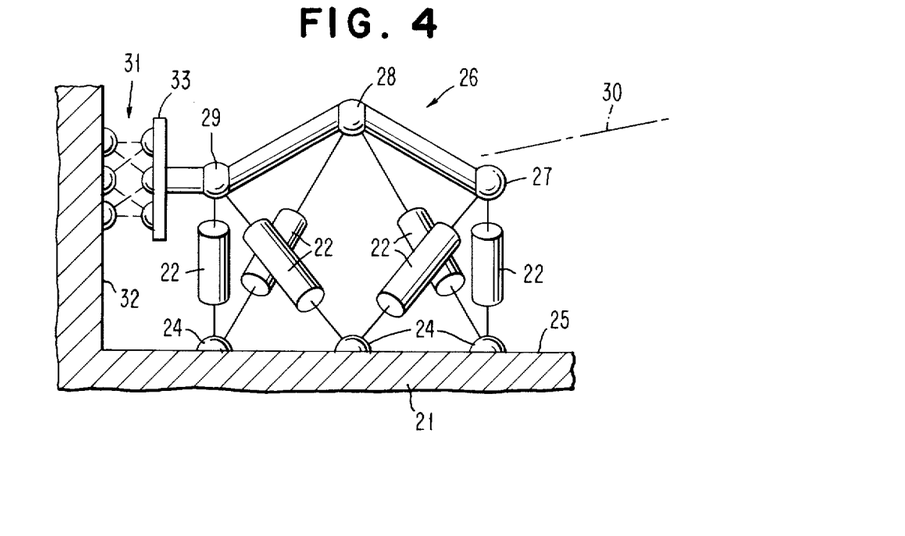
FIG. 4 is a side view of a mechanical arrangement which incorporates a plurality of actuators and interferometers which permits continuous rotation about axes covering a limited range of directions. In this instance, the movable body is a crankshaft-like structure.

While accurate partial rotations about any axis are possible utilizing the arrangements of FIGS. 3A, 3B, the arrangement shown does not permit continuous rotation. Continuous rotation about axes covering a limited range of directions, however, can be accommodated by the crankshaft like structure shown in FIG. 4. FIG. 4 is a side view of a mechanical arrangement which incorporates a plurality of actuators and interferometers which permit continuous rotation about a selected axis covering a limited range of directions. Where possible, elements of FIG. 4 which are similar to those shown in FIGS. 3A, 3B are given the same reference characters. In FIG. 4, reference body 21 is arranged to have a pair of surfaces disposed in juxtaposition with the mechanical arrangement shown. One surface 25 contains three noncollinear points 24 disposed in the same manner as shown in FIG. 3A. Movable body 26 carries three spherical bearings 27, 28, 29. Movable body 26 has a crank shaft like aspect and, when properly actuated, is capable of rotation about an arbitrarily selected axis of rotation 30, for example. Actuators 22 which are similar to the actuators 22 shown in FIGS. 3A and 3B are interconnected in such a way that a spherical bearing or point 29, for example, is connected to the nearest bearings or points 24 on reference surface 25. Similarly, spherical bearing 28 is connected to the two nearest points 24 on surface 25 and spherical bearing 27 is connected to its two nearest points on reference surface 25. An interferometer arrangement shown at 31 in FIG. 4 utilizes another reference surface 32 of reference body 21 to act as a reference surface for a movable body 33 which is connected to spherical bearing 29. In interferometer arrangement 31, a plurality of interferometers similar to that shown in FIG. 1B is utilized to position movable body 26 along axis of rotation 30 so that movable body 26 can be rotated about axis of rotation 30. In this instance, interferometer signals must be processed by computer to provide composite error signals for actuators, as mentioned above. Interferometers must be of tracking type wherein the interference pattern itself is used to detect misalignment of the collimator axis with its associated retroreflector sphere. A signal generated by misalignment of the retroreflector sphere from its collimator axis can be used to steer the axis back into alignment with the retroreflector sphere. Thus, if the retroreflector sphere of interferometer arrangement 31 moves, it can be tracked by detecting the presence of interference fringes.

Figure 5:
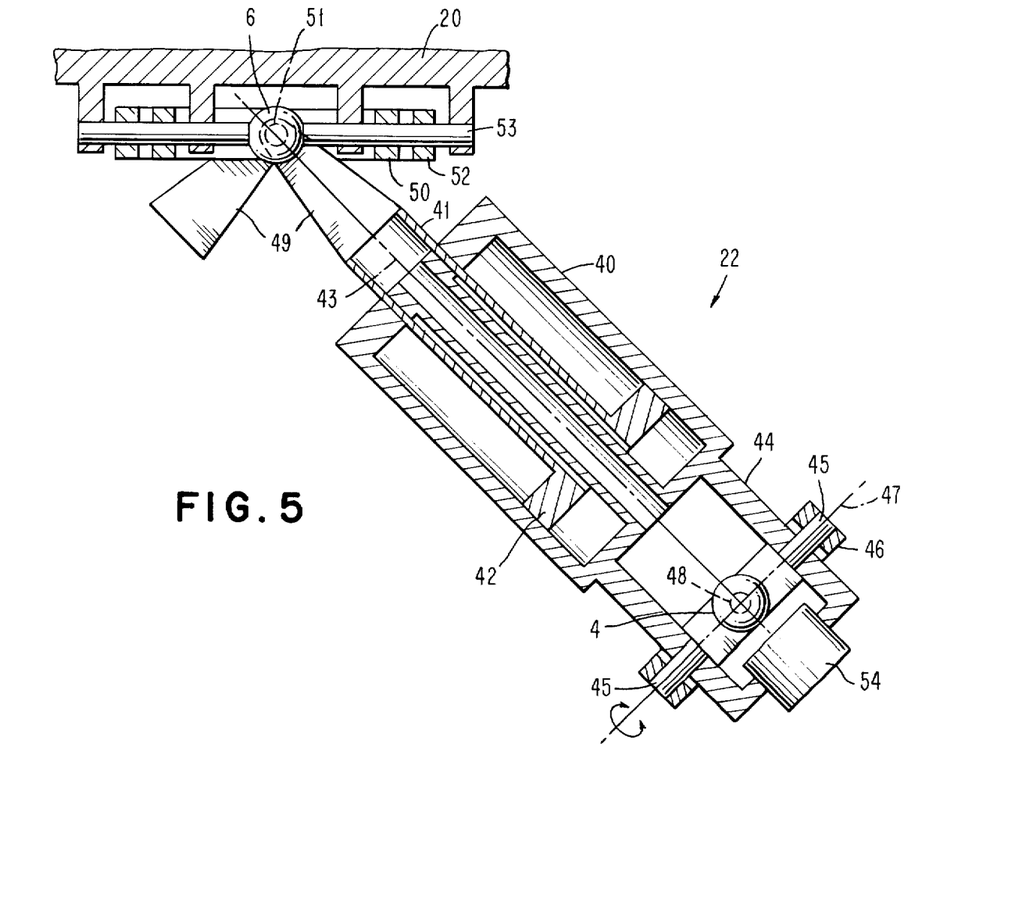
FIG. 5 is a partial block diagram-partial cross-sectional view of an actuator in accordance with the teaching of the present invention in which the longitudinal axis of the actuator and the optical axis of an internally disposed interferometer are coincident. The axes of rotation of portions of the actuator are also shown to be coincident with the centers of the spherical or radiation directing elements of the interferometer.

Referring now to FIG. 5, there is shown therein, a partial block diagram-partial cross-sectional view of an actuator in which the longitudinal axis of the actuator and the optical axis of an internally disposed interferometer are coincident. In FIG. 5, an embodiment of an actuator in accordance with the teaching of the present invention is shown generally at 22. In FIG. 5, a movable body 20 is shown connected via an actuator 22 to a reference body 21 (not shown) in a manner similar to that shown in FIG. 3B. Actuator 22 consists of a hollow annular hydraulic cylinder 40 into which a hollow piston rod 41 is inserted. Piston rod 41 has an annular piston 42 which extends from the end of rod 41 across the annular chamber of hollow cylinder 40. Annular cylinder 40 is filled with hydraulic fluid on both sides of annular piston 42 in the manner of a double acting hydraulic cylinder such that a differential pressure between the fluids on either side of piston 42 causes piston rod 41 to be moved in a rectilinear manner along the longitudinal axis of actuator 22 which in the instance of FIG. 5 is coincident with the optical axis 43 of an interferometer similar to that shown in FIG. 2. Annular piston 42 divides annular cylinder 40 into two chambers, each of which has hydraulic fluid entrance and exit ports (not shown) into which hydraulic fluid is introduced or from which hydraulic fluid is withdrawn to provide differential hydraulic pressures on either side of piston 42 in a manner well known to those skilled in the hydraulics art. These ports and the seals which prevent the leakage of hydraulic fluid have not been shown inasmuch as they form no part of the present invention and do not depart in any significant way from arrangements already known in the prior art. Hollow annular cylinder 40 is connected via a trunnion 44 and pins 45 to a gimbal ring 46 in such a way that actuator 22 is rotatable about the axis of rotation 47 of pins 45. Gimbal ring 46 is connected via pins 48 (one of which is shown in phantom in FIG. 5) disposed on the outer periphery of gimbal ring 46 to a reference surface, not shown, such that actuator 22 is rotatable about the axis of rotation of pins 48. Piston rod 41 is connected via a forked piston rod trunnion 49 (one tine of which is shown in FIG. 5) to an inner gimbal ring 50 by means of pins 51 (one of which is shown in phantom in FIG. 5) disposed on the inner periphery of gimbal ring 50. Another actuator 22 having a forked trunnion 49 is connected via pins to the outer periphery of a second gimbal ring 52. The axis of rotation of the pins for gimbal ring 52 is coincident with the axis of rotation of pins 51 and, as such, are coincident with the phantom pin 51 shown in FIG. 5. Both gimbal rings 50, 52 are pinned via shaft 53 to movable body 20 in such a way that body 20 is capable of rotating about shaft 53.

A glass sphere 6 similar to that shown in FIGS. 1 and 2 is shown in FIG. 5 interposed in shaft 53 with its center intercepting the optical axis 43 which is coincident with the longitudinal axis of actuator 22. Another glass sphere 4 is shown mounted internally of cylinder trunnion 44 by means of extensions (not shown) of trunnion pin 48. Sphere 4, like sphere 6, has its center coincident with the optical axis 43 and with sphere 6 forms a reflection type interferometer similar to that shown in FIG. 2. Light or other electromagnetic energy is projected along optical axis 43 from a source such as a laser and the interference fringes are counted in a fringe counter using well known bidirectional counters and these are represented in FIG. 5 by element 54 which is attached to cylinder trunnion 44.

In operation, light from a source disposed within element 54 is collimated by sphere 4 and passes unimpeded through the opening in annular cylinder 40 between the tines of forked trunnion 49 to sphere 6 where the incident energy is retroreflected back via the same path to sphere 4 where the interference fringes are detected in the same manner described in connection with FIG. 2 and counted in a bidirectional counter, for example. This count may be compared with a desired count in a comparator circuit and an analog signal developed to drive the piston rod 41 in a way which will contribute to the positioning of movable body 20 in a desired position. It should be appreciated that each of the actuators shown in FIG. 3B is constructed in a manner similar to actuator 22 shown in FIG. 5 and that each of the six actuators is operating in a desired way to position movable body 20 in a desired manner under control of a programmed computer. Alternatively, the signals obtained from a bidirectional counter disposed within element 54 could be utilized to maintain movable body 20 in a desired position by opposing, by means of forces on actuators 22, forces applied to movable body 20 which would move it from a desired position. Movable body 26 of FIG. 4 may be controlled in a manner similar to that just described in connection with the arrangement of FIG. 3B. Thus, body 26 may be positioned under computer control of actuators 22 or body 26 may be maintained in a desired position using signals obtained from bidirectional counters to generate forces which oppose forces which tend to move body 26 from a desired position.

Figure 6A:
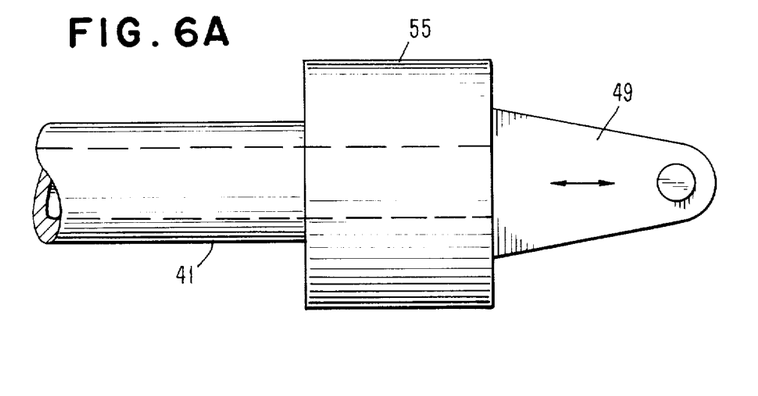
FIG. 6A shows a transducer disposed in series with a trunnion and piston rod which may be utilized to apply small motions to meet the high frequency stability requirements of a feedback system which incorporates hydraulic actuators.

What has been shown in FIG. 5 is a form of actuator based on the principle of a double acting hydraulic cylinder. Hydraulic mechanisms have the advantage of generating large forces while occupying only a small space, but have only a limited frequency response. To use the arrangements described hereinabove to the best advantage, each feedback loop which controls the differential pressures within the hydraulic actuators should have substantial gain up to the lowest mechanical resonant frequency of the movable or fixed body considered alone. Above that frequency, fixing three points does not fix any other point on the body and accuracy is degraded. Of course, gain (or rather a prescribed rate of decrease of gain) is still required at higher frequencies to meet stability requirements. To meet the high frequency requirements, another transducer can be disposed mechanically in series with cylinder 40 or piston rod 41. Such an arrangement is shown in FIG. 6A wherein a transducer 55 is shown disposed between hollow piston rod 41 and a trunnion 49. Transducer 55 is adapted to generate only small displacements (determined by the high frequency mechanical output admittance of actuator 22), but is required to have the full output force capability of the system. Transducer 55 may be either a piezoelectric or magnetostrictive transducer. In the latter case, a magnetostrictive transducer, for example, can be part of the actuator itself as shown in FIG. 6B.

Figure 6B:
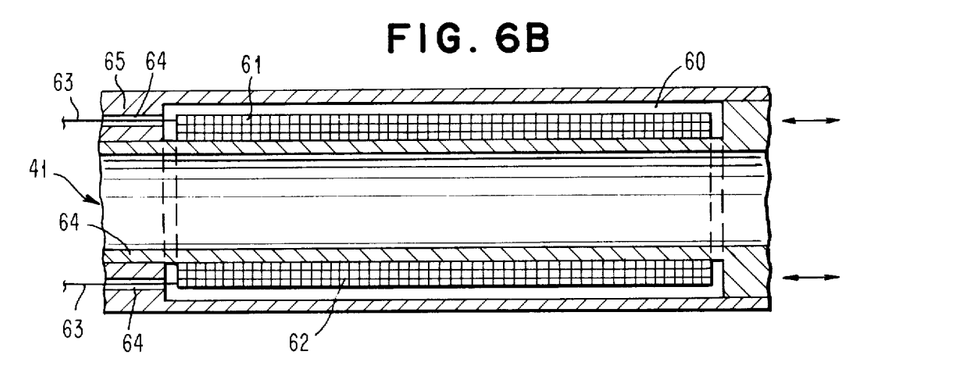
FIG. 6B shows a cross-sectional view of a magnetostrictive transducer having the ability to generate small displacements which is disposed within the movable piston rod, for example, of FIG. 5.

In FIG. 6B, piston rod 41 is double-walled and has an annular recess 60 into which a solenoid 61 is placed. Solenoid 61 is positioned within recess 60 and leads 63 are led out at the ends opposite to the piston through axial holes 64 in the outer wall 65. Both walls 64, 60 are fabricated from magnetostrictive material. Thus, piston rod 41 forms a rigid member the dimensions of which can be changed in response to a signal applied to solenoid 61. In this manner, very small changes in dimension can be applied very quickly to cause incremental changes in the distance between spherical elements of the interferometer.

Figure 6C:
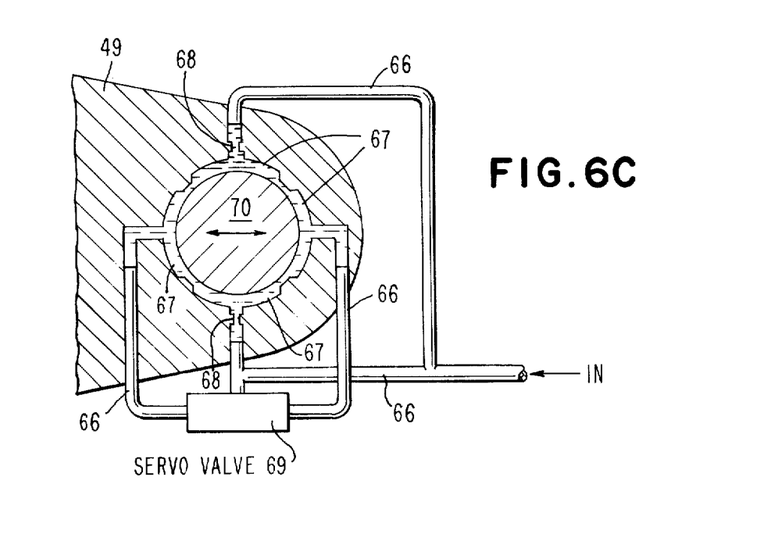
FIG. 6C shows a partial cross-sectional-partial block diagram of a hydrostatic bearing which may be utilized as an interconnection bearing for connecting the actuator of FIG. 5 to either the movable piston or hollow annular cylinder portions of that actuator.

Another approach which utilizes a hydrostatic bearing in the gimballed connections at one end of actuators 22 to control the clearance between the bearing and trunnion by differentially varying the flow of hydraulic fluid through opposing pads of the bearing by means of a servo valve is shown in FIG. 6C. In FIG. 6C, the tine of a trunnion 49 is shown containing a plurality of hydraulic fluid flow channels 66 which terminate in bearing pads 67 formed in trunnion 49. Hydraulic fluid under pressure is led directly from an input labelled "In," through fixed restrictors 68 to upper and lower bearing pads 67. Hydraulic fluid which enters servo valve 69 is differentially controlled in a well known manner to apply different fluid pressures on left and right bearing pads 67. The differential pressures on either side of a bearing member 70 controls the position of bearing member 70 relative to left and right bearing pad 66 and, as a result, its position relative to trunnion 49. In effect, bearing member 70 is converted into a hydraulic actuator of very short strokes, equal to the clearance.

Figure 7A:
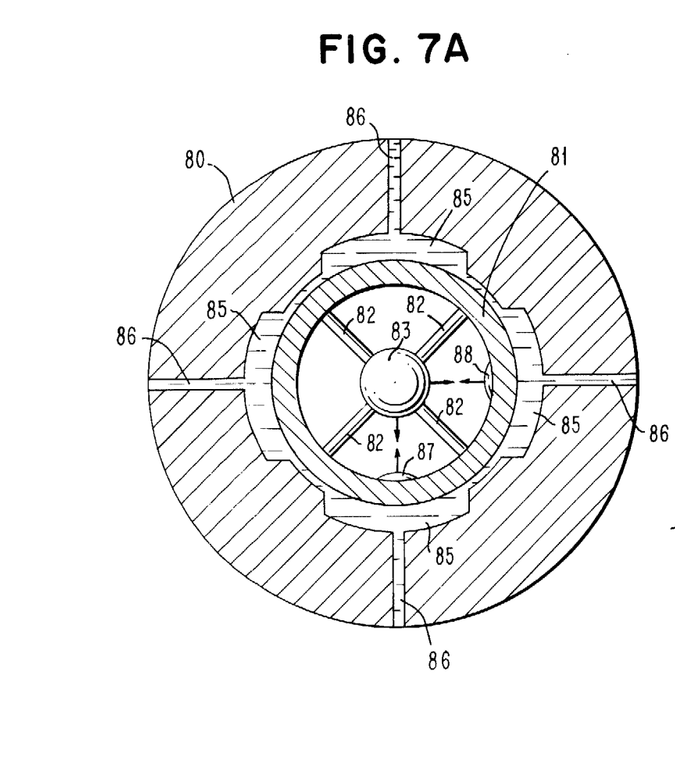
FIG. 7A is a cross-sectional view of an overhung spindle showing an axial spindle controlled by radial and axial hydrostatic bearings, each having pairs of differentially actuated opposing pads. Internally disposed interferometers of the type shown in FIG. 2 control the position of the spindle by introducing hydraulic fluid into the various inlets at appropriate rates when errors are detected by fringe detectors and counters (not shown).
Figure 7B:
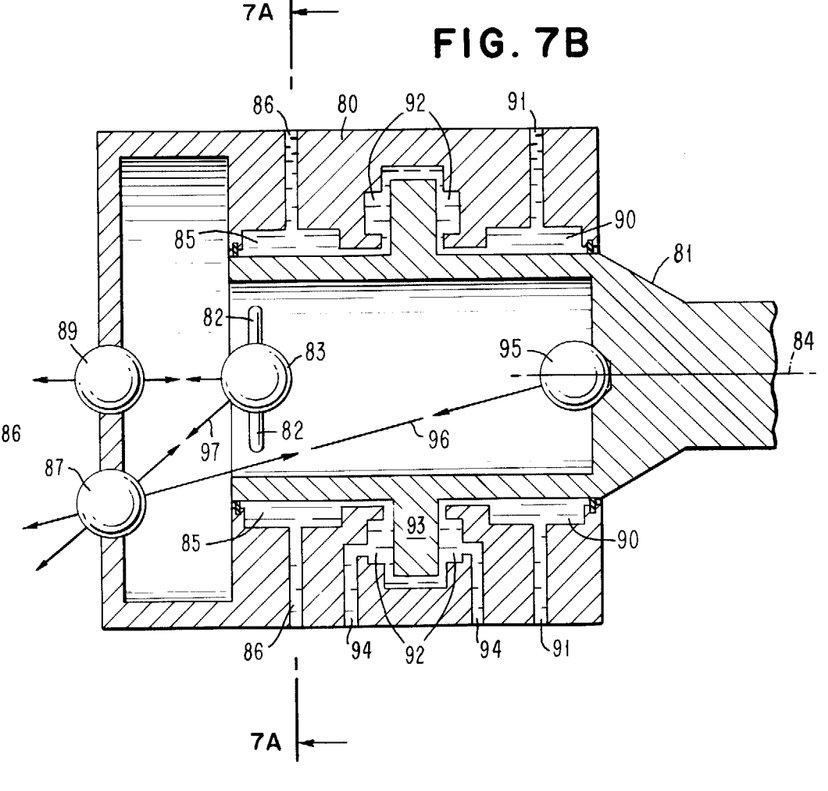
FIG. 7B is a sectional view of the arrangement of FIG. 7A taken along line 7B—7B of FIG. 7A.

The same approach may also be applied in the special case where motion is limited to rotation about a single, precisely defined axis as in a machine spindle. This axis may be defined by a pair of spheres and radial error control can be accomplished by means of two hydrostatic bearings, each with two pairs of differentially actuated opposing pads. Axial control can be obtained by means of a similarly arranged thrust bearing. FIG. 7A–7B shows an end view and a cross-sectional view, respectively, of an overhung spindle incorporating such an arrangement.

FIG. 7A is a cross-sectional view of a spindle taken along lines 7A of FIG. 7B showing a housing 80 and a spindle 81 disposed internally of housing 80. In FIGS. 7A, 7B, a spider 82 holds a spherical element 83 such that the center of spherical element 83 is coincident with the longitudinal axis 84 of spindle 81. A plurality of pairs of bearing pads 85 formed in housing 80 are disposed circumferentially about spindle 81 and are connected to servo valves (not shown) via hydraulic fluid channels 86. Two other spherical elements 87 and 88 (as shown in FIG. 7A) are mounted in the back wall of housing 80 and are disposed therein 90° apart. Another spherical element 89 is similarly mounted in the back wall of housing 80 and is disposed such that its center is coincident with the longitudinal axis 84 of spindle 81. In addition to bearing pads 85, housing 80 contains a plurality of pairs of bearing pads 90 which are disposed circumferentially about spindle 81 in the same manner as bearing pads 85. Bearing pads 90 are connected to servo valves (not shown) by hydraulic fluid channels 91. In addition, FIG. 7B shows a pair of thrust bearing pads 92 disposed on either side of a flange 93 which extends radially from spindle 81. The application of differential pressures via a servo valve (not shown) and via hydraulic fluid channels 94 controls the position of spindle 81 axially. FIGS. 7A and 7B do not show seals and drainage channels which prevent the leakage of hydraulic fluid and ensure its return to a hydraulic reservoir. The disposition of such seals and channels is obvious to one skilled in the hydraulic arts and has not been shown for purposes of clarity.

In operation, spherical elements 87, 88 and 89 each form a collimating sphere in combination with spherical element 83 which acts as a retroreflector for each of the collimating spheres. In addition to retroreflector sphere 83, an additional retroreflector sphere 95 is fixedly mounted on a portion of spindle 81 such that its center is coincident with the longitudinal axis 84 of spindle 81. In a manner similar to the arrangement just described, spheres 87 and 88 form a plurality of interferometer arrangements with spherical element 95 acting as a retroreflector for each of the spherical elements 87 and 88. In addition, spherical element 89 which is mounted on a rear wall of housing 80 acts as a collimator of another interferometer with spherical element 83 acting as its retroreflector. Thus, sphere 87 transmits light from a source (not shown) along interferometer path 96 to spherical element 95 from whence it is reflected back along path 96 to spherical element 87 where, in a manner similar to that discussed in connection with FIG. 2, interference fringes appear and are detected by a fringe detector and counter (not shown). Another similarly arranged interferometer which includes spherical elements 88 and 95 operates in a manner similar to that just described, each interferometer arrangement has its own source and fringe detector and counter. Referring again to spherical element 87 of FIG. 7B, another source (not shown) projects light at spherical element 87 wherein it is collimated and projected along optical path 97 to spherical element 83 which acts as a retroreflector, reflecting the incident light back along interferometer path 97 to spherical element 87 wherein interference fringes are generated which are detected by an associated fringe detector and counter (not shown). In a similar manner, an interferometer with its own light source and fringe detector and counter is formed with spherical elements 88 and 83. Finally, spherical element 89 in combination with spherical element 83 forms another interferometer with its own light source and fringe detector and counter (not shown). In the arrangement shown, interferometers formed from spherical elements 87-95, 88-95 are utilized to control the differential pressures applied to pairs of bearing pads 90 via hydraulic flow channels 91 from servo valves which in turn are controlled by outputs from fringe detectors and counters. In like manner, interferometers formed from spherical elements 87-83, 88-83 control pairs of bearing pads 85 which are differentially actuated via hydraulic flow channels 86. Finally, the interferometer which includes spherical elements 89-83 is used to control the differential pressures applied via hydraulic fluid channels 94 to thrust bearing pads 92.

In operation, spindle 81 is brought up to operating position and the fringe counters associated with each of the interferometer arrangements sets to zero under no-load conditions. Since it is departures from a given position, both radially and axially, which are to be controlled, such departures can be detected when load is applied to spindle 81 and, in accordance with well known feedback and hydraulic techniques, the position of spindle 81 can be adjusted to maintain a desired position.

The linear velocities at which control can be maintained depend, apart from the dynamic response of feedback loops, on cycle times of the circuitry which controls the calculation of errors and the like. One error signal per microsecond (a very conservative calculation rate) maintains accuracy within one fringe ($3 \times 10^{-5}$ cm.) at velocities up to about $(3 \times 10^{-5})/(10^{-6}) = 30$ cm/sec$^{-1}$, which is comparable with machine tool cutting speeds of 30–60 cm/sec$^{-1}$ (60 to 120 feet per minute), and much faster than needed in most other precise mechanisms.

Figure 8:
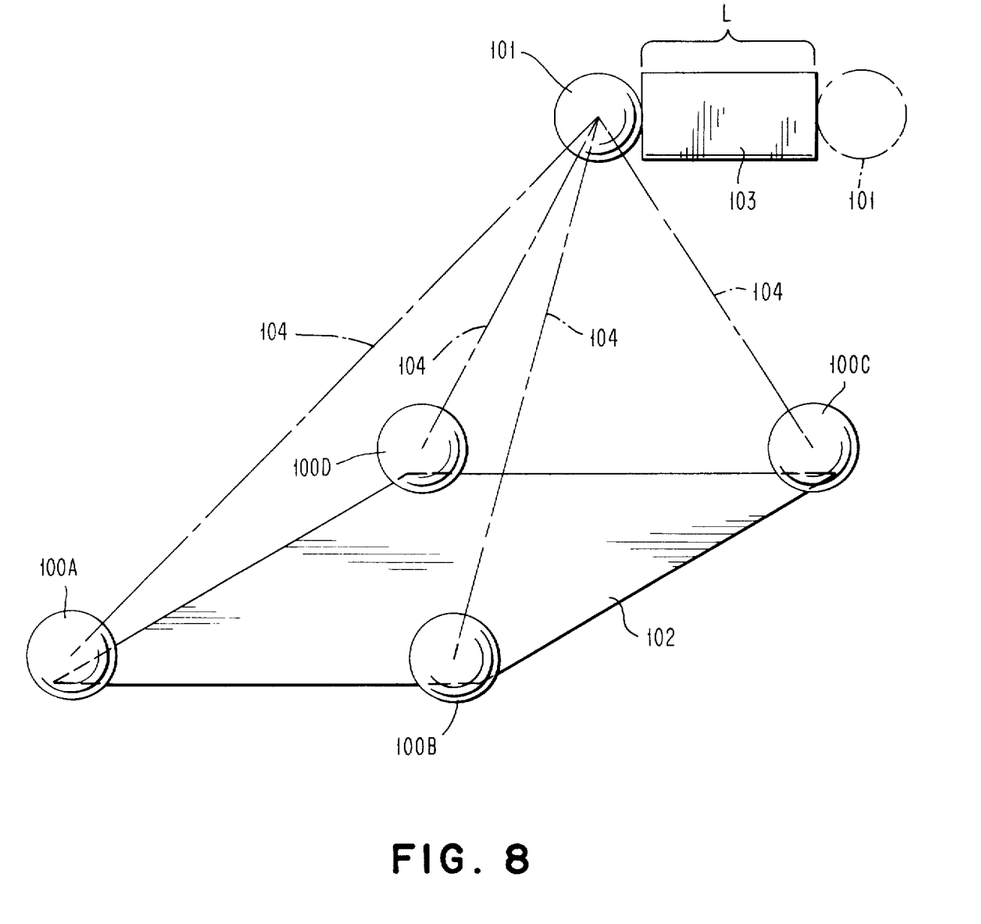
FIG. 8 is a perspective view of a plurality of point-to-point interferometers similar to that shown in FIG. 2. Each interferometer consists of a sphere of index of refraction 2 disposed at a known position on a planar surface and a movable sphere of index of refraction 2. The latter is common to each of the plurality of interferometers.

Referring now to FIG. 8, there is shown a perspective view of a plurality of point-to-point interferometers similar to that shown in FIG. 2. In the arrangement shown, glass spheres of refractive index 2 serve as the reflecting and beam splitting elements in a system which forms the basis of an extremely accurate and versatile measuring machine for inspecting the accuracy of other machines and of workpieces. In FIG. 8, only a plurality of beam splitter and collimator spheres 100A–100D similar to sphere 4 in FIG. 2 and a retroreflector sphere 101 similar to sphere 6 in FIG. 2 have been shown. It should be appreciated that each of the point-to-point interferometers formed by spheres 100A–100D and sphere 101 have associated therewith a laser source 2 similar to that shown in FIG. 2, a beam splitter from which the incident energy is partially reflected and partially transmitted similar to beam splitter 11 shown in FIG. 2, a condenser lens by which the partially transmitted component is focused onto a partially reflecting surface of spheres 100A–100D, similar to condenser lens 3 shown in FIG. 2 and a fringe detector and counter similar to that indicated by block 9 in FIG. 2. Thus, each of the interferometer arrangements formed by spheres 100A–100D with sphere 101 operates in the same manner as the point-to-point interferometer described hereinabove in connection with FIG. 2. In FIG. 8, each of the spheres 100A–100D is shown disposed at the corners of a planar surface 102. Sphere 101, which forms a retroreflector for each of the spheres 100A–100D, is movable in all directions and, as such, can be positioned adjacent a workpiece 103 to determine certain of the dimensions of workpiece 103 without moving it. Thus, the length L of workpiece 103 may be determined by positioning sphere 101 at two successive positions at the extremities of workpiece 103 as shown in FIG. 8 and determining the position of planes in which the extremities of workpiece 103 lie in a manner to be described hereinbelow.

Before proceeding with the determination of the planes in which the extremities of workpiece 103 lie, it should be noted that spheres 100A–100D which act as collimators and beam splitters also form an image of sphere 101 which acts as a retroreflector. It is possible, by standard image scanning techniques or by using the interference pattern itself to detect misalignment of the collimator axis with the retroreflector sphere 101. Collimator axes for each of the interferometer arrangements in FIG. 8 are indicated by centerlines 104. A signal generated by this misalignment from an axis 104 can be used to steer the axis back into alignment with retroreflector sphere 101. Under such circumstances, if retroreflector sphere 101 is moved, it can be tracked by detecting the presence of interference fringes and, if the interference fringes are counted in a bidirectional counter, the distance of retroreflector sphere 101 is known at all times to within $\lambda/2$ (or less if a counter is used which would sense fractional fringe displacements). It should be appreciated that the alignment tracking need only be accurate enough to maintain a continuous fringe count; it plays no other part in locating retroreflector sphere 101. The absolute range can be established by resetting the fringe counter when the two spheres (of known radii) are in contact.

By using three such tracking collimator arrangements formed from spheres 100A and 101, 100D and 101, 100C and 101, respectively, each operating with spheres 100A, 100C and 100D in a known position, the position in space (except for mirrorplane ambiguity) of movable retroreflector 101 can be calculated at any time by a small digital processor (not shown) using the three fringe counts as inputs. If, for example, retroreflector 101 is moved by hand into contact with workpiece 103 to be measured and an instruction is sent to the processor to calculate and store its position, a piece of information is generated about the surface of workpiece 103, namely, that it is tangent to a sphere of known center and radius (that of retroreflector 101). On repeating this process several times, enough information can be built up to characterize the position and dimensions of an element of the surface of workpiece 103. For example, the length L of workpiece 103 may be measured by setting workpiece 103 in a fixed (but randomly oriented) position, resting retroreflector sphere 101 at three non-collinear positions against one face of workpiece 103 and instructing the processor to interpret the three sets of results as defining a plane. On repeating the process with the other extremity of workpiece 103 with sphere 101 (shown dotted in FIG. 8), and calculating the separation of the planes, the length L of workpiece 103 can be determined. In a similar manner, four points can be interpreted as defining a sphere of calculable radius and position; five as a circular cylinder with position, radius, and orientation and so on. It should be appreciated that all this is done, with an accuracy of the order of an optical wavelength, with only four parts (glass spheres 100A, 100C, 100D and 101) which have to be finished to a comparable accuracy. The use of a digital processor permits the measurements to be transformed in any way which is convenient; projections on arbitrary sets of axes or planes, rigid rotations, etc. By making redundant measurements, followed by a least squares fit, departures from the assumed form (plane, sphere, etc.) can be measured.

In practice, it is desirable to introduce some redundancy in the tracking of the retroreflector by adding a fourth tracking collimator formed from spheres 100B and retroreflector sphere 101. This allows an internal check of the results, or permits any one beam to be interrupted accidentally (say by the operator's hand) and removes the mirror plane ambiguity if the four spheres 100A, 100B, 100C, 100D do not lie in one plane.

In connection with the arrangement shown in FIGS. 3A and 3B, it should be appreciated that a degenerate form of the mechanism shown would be a single actuator and interferometer with feedback arranged to keep the length permanently constant. Such an infinitely rigid link would have uses in eliminating otherwise unavoidable elastic deflections from a structure.

While only a few mechanical arrangements have been shown which incorporate interferometers, hydraulic actuators and hydraulic bearings, it should be appreciated that the arrangements shown have applications in the machine tool, inspection, optical and data processing arts. For example, in the machine tool art the present teaching has application with very large machines (horizontal boring mills) where attaining even limited alignment accuracy and rigidity are longstanding problems. Application can also be found in very accurate machines such as jig borers and grinders where extremely accurate table movements are required. As shown in connection with FIG. 7B, the teaching of the present application can be utilized in controlling accurately the spindles for grinders, boring mills, lathes and the like. Other applications include accurate thread cutting and indexing of rotary tables which act as work holders. In the inspection area, the teaching of the present application can be utilized in coordinate measuring machines and in roundness measurement. In optics, the teaching of the present application can be utilized in connection with mask alignment, art work generation, step and repeat mechanisms and in focusing and pointing adjustments on large cameras, telescopes and collimators.

Finally, in the data processing area, the teaching of the present application can be utilized for positioning magnetic heads and in the accurate positioning of disk pack spindle bearings.

While the invention has been particular shown with reference to a preferred embodiment thereof, it will be understood by those skilled in the art that the foregoing and other changes in form and details may be made therein without departing from the spirit and scope of the invention.

What is claimed is:

1. An interferometer arrangement comprising:
    a source of electromagnetic radiation for projecting said radiation along a given path; and
    a pair of at least partially spherical, transparent elements disposed in said given path, said elements having an index of refraction of approximately 2 at the wavelength of said source.

2. An interferometer arrangement according to claim 1 wherein one of said pair of elements is a retroreflector and the other is a collimator.

3. An interferometer arrangement according to claim 1 wherein both of said elements are collimators.

4. An interferometer arrangement according to claim 1 wherein at least one of said elements is a beam splitter.

5. An interferometer arrangement according to claim 1 wherein said elements are glass spheres.

6. An interferometer arrangement according to claim 1 wherein said source is a laser.

7. An interferometer arrangement according to claim 1 further including means connected to at least one of said elements for applying relative motion between said elements.

8. An interferometer arrangement according to claim 7 further including means disposed in electromagnetically coupled relationship with said elements for detecting interference fringe patterns.

9. An interferometer arrangement according to claim 8 further including means responsive to said detecting means for actuating said means for applying relative motion.

10. An interferometer-mechanical arrangement for controlling the movement of a movable body relative to a reference body comprising, in combination:
    at least one actuator having a given longitudinal axis connected between at least a point on each of said bodies;

at least a source of electromagnetic radiation for projecting radiation of given wavelength along at least a given path said at least a given path extending between each of said bodies; and a pair of at least partially spherical elements disposed in said at least a given path, said elements having an index of refraction of approximately 2 at the wavelength of said source.

11. An interferometer-mechanical arrangement according to claim 10 wherein said elements are glass spheres.

12. An interferometer-mechanical arrangement according to claim 10 further including interference fringe detection means disposed in said at least a given energy path.

13. An interferometer-mechanical arrangement according to claim 10 further including interference fringe counting means disposed in said at least a given energy path for monitoring the relative motion applied by said at least one actuator to said movable body and said reference body.

14. An interferometer-mechanical arrangement according to claim 10 wherein said pair of elements is disposed internally of said at least one actuator and said given path and said given longitudinal axis are coincident.

15. An interferometer-mechanical arrangement according to claim 10 further including transducer means integral with said at least an actuator to generate small displacements along a desired path.

16. An interferometer-mechanical arrangement according to claim 12 further including means responsive to said fringe detection means for actuating said at least one actuator to move or maintain said movable body and said reference body to or in a desired relationship.

17. An interferometer-mechanical arrangement according to claim 13 further including means connected to said at least one actuator for applying relative motion between said movable body and said reference body.

18. An interferometer-mechanical arrangement according to claim 15 wherein said transducer means is a magnetostrictive transducer including a magnetostrictive member integral with said actuator and a solenoid disposed in magnetostrictively coupled relationship with said member.

19. An interferometer-mechanical arrangement according to claim 15 wherein said transducer means is an hydrostatic transducer comprising:
   a fixed bearing member;
   a movable bearing member containing a plurality of flow channels each terminating in a bearing pad, said bearing pads being disposed in circumferential space of relationship about said fixed member; and
   means connected to certain of said flow channels for applying differential pressure to their oppositely disposed associated bearing pads to apply motion to said movable bearing member along said desired path.

20. An interferometer-mechanical arrangement according to claim 16 wherein said means for actuating said actuator includes:
   means for comparing measured interference fringe counts with desired fringe counts;
   means for generating error signals determined by differences between counts; and
   means responsive to said means for generating error signals for producing a force in said at least one actuator which tends to reduce the difference between said measured and desired fringe counts.

21. An interferometer-mechanical arrangement according to claim 17 wherein said means connected to said at least one actuators for applying relative motion between said movable and said reference bodies includes:
   means coupled to said at least one actuator for applying a force to said at least one actuator;
   means for comparing measured interference fringe counts with desired fringe counts;
   means for generating error signals determined by differences between counts; and
   means connected to said means for applying for halting the application of said force when the difference between said counts is zero.

22. An interferometer-mechanical arrangement for controlling the movement of a movable body relative to a reference body comprising, in combination:
   a plurality of actuators each having a given longitudinal axis connected between points on said bodies at least three points on each of said bodies being disposed thereon in noncollinear relationship;
   a plurality of sources of electromagnetic radiation for projecting radiation of given wavelength along a plurality of given paths said given paths extending between each of said bodies; and
   a pair of at least partially spherical elements disposed in each of said given paths, said elements having an index of refraction of approximately 2 at the wavelength of said source.

23. An interferometer-mechanical arrangement according to claim 22 wherein said elements are glass spheres.

24. An interferometer-mechanical arrangement according to claim 22 further including interference fringe detection means disposed in each of said given energy paths.

25. An interferometer-mechanical arrangement according to claim 22 further including interference fringe counting means disposed in each of said given energy paths for monitoring the relative motion applied by each actuator to said movable body and said reference body.

26. An interferometer-mechanical arrangement according to claim 22 wherein said pair of elements is disposed internally of each of said actuators and said given paths and said given longitudinal axes are coincident.

27. An interferometer-mechanical arrangement according to claim 22 further including transducer means integral with each of said actuators to generate small displacements along a desired path.

28. An interferometer-mechanical arrangement according to claim 24 further including means responsive to said fringe detection means for actuating each of said actuators to move or maintain said movable body and said reference body to or in a desired relationship.

29. An interferometer-mechanical arrangement according to claim 25 further including means connected to each of said actuators for applying relative motion between said movable body and said reference body.

30. An interferometer-mechanical arrangement according to claim 27 wherein said transducer means is a magnetostrictive transducer including a magnetostrictive member integral with said actuator and a solenoid disposed in magnetostrictively coupled relationship with said member.

31. An interferometer-mechanical arrangement according to claim 27 wherein said transducer means is an hydrostatic transducer comprising:
- a fixed bearing member;
- a movable bearing member containing a plurality of flow channels each terminating in a bearing pad, said bearing pads being disposed in circumferential space of relationship about said fixed member; and
- means connected to certain of said flow channels for applying differential pressure to their oppositely disposed associated bearing pads to apply motion to said movable bearing member along said desired path.

32. An interferometer-mechanical arrangement according to claim 28 wherein said means for actuating said actuators includes:
- means for comparing measured interference fringe counts with desired fringe counts;
- means for generating error signals determined by differences between counts; and
- means responsive to said means for generating error signals for producing forces in said actuators which tend to reduce the difference between said measured and desired fringe counts.

33. An interferometer-mechanical arrangement according to claim 29 wherein said means connected to each of said actuators for applying relative motion between said movable and said reference bodies includes:
- means coupled to each of said actuators for applying a force to each of said actuators;
- means for comparing measured interference fringe counts with desired fringe counts;
- means for generating error signals determined by differences between counts; and
- means connected to each of said means for applying for halting the application of said force when the difference between said counts is zero.

34. An interferometer-spindle arrangement comprising:
- a spindle having a circular hollow portion given a longitudinal axis, and a flange extending outwardly from said portion, a housing into which the hollow portion of said spindle is receivable containing a plurality of flow channels certain of which terminate in bearing pads disposed in circumferential spaced relationship about said spindle and certain others of which terminate in thrust bearing pads disposed in spaced relationship on opposite sides of said outwardly extending flange;
- a first plurality of at least partially spherical radiation directing elements having an index of refraction of approximately 2 at a given wavelength mounted in a wall of said housing, one of said first elements being coincident with said longitudinal axis the remainder being spaced from said one of said first elements by a given radius, and a second plurality of at least partially spherical elements having an index of refraction of approximately 2 at a given wavelength disposed internally of said hollow portion of said spindle, the centers of said second plurality of elements being coincident with said longitudinal axis;
- a first plurality of light sources operating at said given wavelength one of which is in conjunction with said one of said first elements and one of said second plurality of elements comprises a first interferometer having a first optical axis others of which in conjunction with said remainder of said first plurality of elements and with said one of said second plurality of elements comprises a first plurality of interferometers, having a first plurality of optical axes;
- a second plurality of light sources operating at said given wavelength each of which in conjunction with each of the remainder of said first elements and another of said second plurality of elements comprises a second plurality of interferometers having a second plurality of optical axes; and
- interference fringe counting means disposed in electromagnetically coupled relationship with said first interferometer and said first and second pluralities of interferometers.

35. An interferometer-spindle arrangement according to claim 34 further including means connected to said certain of said plurality of flow channels for applying differential pressure to their oppositely disposed associated bearing pads and to said certain others of said plurality of flow channels for applying differential pressure to their associated thrust bearing pads to control the radial and axial position of said spindle relative to said housing.

36. An interferometer arrangement for measuring distances to surfaces of members disposed in juxtaposition to a planar surface comprising:
- at least three at least partially spherical radiation directing elements disposed on said planar surface said elements having an index of refraction of 2 at a given wavelength;
- a movable at least partially spherical radiation directing element having an index of refraction of 2 at said given wavelength said at least three at least partially spherical radiation directing elements and said movable element forming at least three interferometers the optical axes of which intersect at the center of said movable element; and
- means for projecting electromagnetic radiation at said given wavelength along said optical axes.

37. An interferometer arrangement according to claim 36 further including interference fringe counting means disposed in electromagnetically coupled relationship with said optical axes.

38. An interferometer arrangement according to claim 36 wherein said radiation directing elements are glass spheres having an index of refraction of 2 at said given wavelength.

39. An interferometer arrangement according to claim 36 wherein said means for projecting electromagnetic radiation is a laser.

* * * * *